United States Patent [19]

Harlin et al.

[11] Patent Number: 5,494,965
[45] Date of Patent: Feb. 27, 1996

[54] PROCESS FOR MANUFACTURING OLEFIN POLYMERS AND PRODUCTS PREPARED BY THE PROCESS

[75] Inventors: Ali Harlin, Vantaa; Ulf Palmqvist, Porvoo, both of Finland

[73] Assignee: Borealis Polymers Oy, Porvoo, Finland

[21] Appl. No.: 217,510

[22] Filed: Mar. 24, 1994

[30] Foreign Application Priority Data

Mar. 26, 1993 [FI] Finland .................................... 931343

[51] Int. Cl.⁶ .......................... C08L 23/04; C08L 23/10; C08L 23/18
[52] U.S. Cl. ................ 525/52; 525/53; 525/54; 525/197; 525/240
[58] Field of Search ............................ 525/240, 53, 197, 525/52, 54

[56] References Cited

U.S. PATENT DOCUMENTS

| | | |
|---|---|---|
| 3,347,835 | 10/1967 | Lorenz . |
| 4,336,352 | 6/1982 | Sakurai et al. . |
| 4,550,143 | 10/1985 | Tanaka et al. . |
| 4,617,352 | 10/1986 | Page et al. . |
| 5,149,738 | 9/1992 | Lee et al. . |
| 5,189,106 | 2/1993 | Morimoto et al. . |

FOREIGN PATENT DOCUMENTS

| | | |
|---|---|---|
| 0100843 | 2/1984 | European Pat. Off. . |
| 0129312 | 12/1984 | European Pat. Off. . |
| 0533160 | 3/1993 | European Pat. Off. . |

OTHER PUBLICATIONS

Ency. Pol. Sci & Eng. –vol. 6, pp. 436–440–1986.
Derwent Abstract of JP 89 22 1003, Aug., 1989.
Derwent Abstract of JP 89 22 1002, Aug., 1989.

*Primary Examiner*—Carman J. Seccuro, Jr.
*Attorney, Agent, or Firm*—Steinberg, Raskin & Davidson

[57] ABSTRACT

A process for manufacturing bimodal olefin polymers and copolymers having a ratio between low molecular weight fractions within the range of 40:60–70:30, by mixing under shear conditions 5–50 percent by weight of a low molecular weight unimodal polyolefin having a molecular weight (Mw) between 15,000–30,000, and 95–50 percent by weight of a bimodal polyolefin having a ratio between low molecular weight fractions and high molecular weight fractions within the range of 30:70–55:45. According to a preferred embodiment, there is used a multi-phase process including a loop reactor followed by a gas-phase reactor, wherein a part of the product coming out from the loop reactor is separated and combined with the bimodal product coming out from the gas-phase reactor.

18 Claims, 1 Drawing Sheet

PROCESS FOR MANUFACTURING OLEFIN POLYMERS AND PRODUCTS PREPARED BY THE PROCESS

FIELD OF THE INVENTION

The invention concerns a process for manufacturing olefin homo- and copolymers having a bimodal molecular weight distribution. Especially the invention concerns a process for manufacturing bimodal olefin polymers for film, pipe or blow molding products and products prepared by the process.

BACKGROUND OF THE INVENTION

Recently, high density polyethylene has achieved commercial success in such products as films, pipes and blow moulding materials. Among these new polymers are high molecular weight high density polyethylene resins having a broad molecular weight distribution.

Polyethylene resins manufactured by using modern high productivity catalysts have often relatively narrow molecular weight distribution. These resins are not ideal for the manufacture of high density polyethylene for extrusion, e.g., film, pipe or molding resins.

Bimodal polyethylenes are polymers, which are composed of low and high molecular weight fractions. These polymers are designed to have a certain balance between fair processability and good mechanical strength properties. The low molecular weight fractions improve the processability properties of the polymer and the high molecular weight fractions improve mechanical properties. In order to increase strength properties the proportion of high molecular weight fractions could be increased. The result is, however, that the product becomes more difficult to process, for example in film extruders. The processing consumes more energy and the surface quality of the films or pipes tend to be inferior. In other words the processability of the product sets certain limits to the proportion of the high molecular weight component. On the other hand the processability can be improved by using as the first component a polymer having very low molecular weight.

In practise it has been found that in view of product properties the low molecular weight component has preferably the following properties: a weight average molecular weight ($M_w$) of 5,000–25,000, a ratio between the weight average molecular weight and the number average molecular weight ($M_n$) of 2.5–9 and a density of 0.960–0.980 g/cm$^3$ for bimodal high density polymer and a 0.925–0.940 g/cm$^3$ for bimodal low density polymer. The melt index (MFR$_2$) of this fraction is typically within the range of 10–1000 g/10 min. The molecular weight of the bimodal end product is between 150,000–400,000, typically 200,000–350,000 and the ratio $M_w/M_n$ is between 20–40. By calculating from these values or experimentally it is obtained for the high molecular weight component typical $M_w$-values of about 400,000–900,000, $M_w/M_n$-values of 4.5–9.5 and densities for bimodal high density materials of 0.930–0.960 g/cm$^3$ and for bimodal low density materials 0.900–0.920 g/cm$^3$. The proportions between the low molecular weight component and the high molecular weight component vary typically between 40:60–65:35 for bimodal polyethylene resins.

According to prior art polyethylene resins having a broad molecular weight distribution are manufactured by two principal methods. The first method consists of blending two or more unimodal polymers having a different molecular weight. The first component can have a greater proportion of relatively low molecular weight fractions and the further components can have a greater proportion of high molecular fractions. Such method is disclosed for example in European patent No. 0 100 843, in which polyethylene is manufactured by blending together 60–30 parts by weight of a low molecular weight high density ethylene polymer having a melt index (MI) within the range of 45–300 g/10 minutes and a density of 0.950–0.975 g/cm$^3$, and 40–70 parts by weight of a high molecular weight high density ethylene polymer having a melt index (MFR$_{21}$) within the range of 0.1–1.5 g/10 min and a density within the range of 0.930–0.945 g/cm$^3$. Another example of blending two unimodal polyethylene components together is EP533160. Also it is known to blend two or more unimodal polyethylene components having different ranges of molecular weights (see EP129312) or blend an unimodal polyethylene component and a bimodal polyethylene component (see EP517222).

The second basic method for producing ethylene polymers having a broad molecular weight distribution consists of a multiphase polymerization process, in which in one reactor a polymer having a low molecular weight and a narrow molecular weight distribution is prepared. Another polymerization reactor is run under conditions, which favor the formation of polymers having a high molecular weight. The reactors are in series so that the polymerization started in the first reactor continues in the second one. In this way it is possible to obtain bimodal ethylene polymers. Also it is known to blend unimodal polyethylene components and bimodal components prepared by a multi-phase process (see EP129312).

Both methods above have certain drawbacks. In the blending method it has been found that the gel content and the number of the fish-eys in the blended product tend to be high. Another drawback in the method is that the possibilities to grade changes are very limited. The only possibility to affect the product properties is to vary the proportions of the blend components, which can be made only within certain limits. Very often a grade change requires selection of components having different molecular weights and/or different densities. This means that the producer has to keep several different blending components available, which demands great investments to storage facilities.

In the continuous multiphase polymerization method the process control is more complicated than in the single-phase polymerization. The transition times are long, especially when the conditions in the first reactor must be adjusted.

In the continuous multiphase polymerization method there are also some drawbacks in the product homogenity. Batch-polymerized bimodal resins can be gel-free, because all particles have the same residence time and composition. A continuous process to produce a bimodal resin in back-mixed reactors gives a mixture of particles with a composition ranging from pure low molecular weight materials to pure high molecular weight materials.

Because of the residence time distribution a part of the material flows immediately through the first reactor forming in the second reactor a lot of high molecular weight fraction. The composition distribution between the particles can be affected either by narrowing the residence time distribution in the first reactor, or removing the small unreacted or less reacted catalyst particles from the polymer before it is fed to the second reactor.

Resins with good mechanical properties can be achieved when in the first reactor a higher proportion of low molecular weight material and in the second reactor a material of very high molecular weight is produced. However the homogenity of the end product will decrease drastically because of composition distribution between particles. Products having a reactor split higher than 55:45 have generally high gel and fish-eye content in the end product.

The expression "reactor split" used in this application means the ratio of the low molecular weight material to the high molecular weight material in a reactor product. The expression "product split" means the corresponding ratio in the end product.

Without limiting to any specific theory one possible explanation is that if more low molecular weight material (by volume) is produced than high molecular weight material, the shear forces during melt homogenization will not be conveyed easily to the areas of high molecular weight. The high molecular weight particles just tend to float around in the low molecular weight/low viscosity fraction and show up as gels or white spots in the end product.

The inhomogenities can be avoided if lower reactor splits, for example 45:55 is used. However, this is not favorable for combination of good processability and good mechanical performance. To achieve bimodal polymers having reasonably good processing properties, e.g., for film or pipe grade polymers, it is necessary to increase the reactor split, which leads to the drawbacks mentioned above.

OBJECTS AND SUMMARY OF THE INVENTION

According to the invention it has been surprisingly found that it is possible to homogenously mix a certain amount of low molecular weight unimodal material to a bimodal material produced in a multiphase polymerization and having a relatively low reactor split, thereby obtaining an end product with a relatively high product split without excessive formation of gel-like agglomerates.

Therefore one object of the invention is a process for manufacturing bimodal olefin homopolymers and copolymers, in which the proportion of the low molecular weight component to the high molecular weight component in the end product (product split) is relatively high without causing excess formation of gels and fish-eyes and which materials have good processability and good mechanical properties.

This object is achieved in the process according to the invention for producing bimodal olefin homopolymers or copolymers, said process comprising melting and mixing together under shear forces at least two polymer components of (a) 5–50 percent by weight of an unimodal low molecular weight olefin polymer having a weight average molecular weight ($M_w$) within the range of 15,000 to 30,000 and a ratio between the weight average molecular weight ($M_w$) and the number average molecular weight ($M_n$) within the range of 2.5–9 and a melt index of 10–1000 g/10 min ($MFR_2$, 190° C.); and (b) 95–50 percent by weight of a bimodal olefin polymer containing 30–55 percent by weight of low molecular weight polyolefin fractions having properties as defined for component (a) above and 70–45 percent by weight of polyolefin fractions having a molecular weight sufficiently high to achieve in the end product formed by components (a) and (b) a weight average molecular weight ($M_w$) within the range 150,000–400,000, $M_w/M_n$ between 10–40 and a ratio between low molecular weight fractions and high molecular weight fractions (product split) of 40:60–70:30.

As mentioned above the invention is based on a discovery that a certain amount of low molecular weight olefin polymer can be melt-mixed with a bimodal olefin polymer having a reactor split between of 30:70–55:45 without formation of excessive amounts of gels. With a definition "olefin polymers" throughout the specification it is meant homopolymers and copolymers of olefin monomers such as ethylene, propylene, butene, hexene, 4-methyl-1-pentene and the like. A preferred olefin is however ethylene and the invention will be hereinafter described as applied to manufacturing bimodal ethylene polymers, although the same kind of problems may be also found in polymerization of other olefin monomers and the same problems can be solved according to the invention.

The low molecular weight component can be an ethylene polymer having a weight average molecular weight ($M_w$) in the range of 15,000–30,000 and a ratio of the weight average molecular weight and the number average molecular weight ($M_n$) within the range of 2.5–9 and a melt index ($MFR_2$) preferably between 10–1000 g/10 min. The density of the polymer can vary between 0.930–0.980 g/cm³. This polymer component can be produced by any polymerization method giving the above-mentioned properties. Thus this process can be a slurry or a gas-phase polymerization process.

The second component for producing bimodal ethylene polymers according to the invention is a bimodal ethylene polymer containing low molecular weight fractions having a weight average molecular weight ($M_w$) within the range of 15,000 to 30,000 and a ratio of the weight average molecular weight and the number average molecular weight ($M_n$) within the range of 2.5–9 and high molecular weight fractions having a calculated $M_w$ within the range of 250,000–700,000 and $M_w/M_n$ with the range of 4.5–9.5. The ratio of the low molecular weight material to the high molecular weight material in the bimodal product (reactor split) is selected so that it is within the range of 30:70–55:45.

Also the bimodal component can be produced by any method producing a product having properties mentioned above. Therefore this product can be produced by slurry-slurry polymerization, slurry-gas phase polymerization or gas phase-gas phase polymerization obtaining bimodal polymer having the properties above and melt indexes of 0.05–10 ($MFR_5$) or 0.5–50 ($MFR_{21}$) and density of 0.915–0.960 g/cm³. A slurry-gas phase process is especially preferred.

Thus according to the invention it is possible to achieve the desired results by melt-mixing said unimodal low molecular weight component and said bimodal component in such proportions that the ratio of low molecular weight material to high molecular weight material (product split) is within the range of 40:60–70:30. In practise this ratio can be achieved when 5–50, preferably 10–50 percent by weight of low molecular weight material is melt-mixed with 95–50, preferably 90–50 percent by weight of bimodal material to produce an end product polymer having $M_w$ preferably within the range of 150,000–400,000 and $M_w/M_n$ between 10–40, high load melt index between 1–60 ($MFR_{21}$) and density between 0.940–0.960 g/cm³.

The two main components for obtaining the ethylene polymers of the invention can be originated from different sources or they can be originated from the same multiphase process. Therefore according to one embodiment of the invention any low molecular weight unimodal polymer and any bimodal polymer having the properties defined above can be melt-mixed to a bimodal ethylene polymer having a product split between the low molecular weight material and the high molecular weight material as specified above.

However according to a preferred process embodiment of the invention bimodal ethylene homopolymers and copolymers are produced in at least one polymerization step sequence comprising polymerizing in a first polymerization step low molecular weight olefin polymer having a weight average molecular weight ($M_w$) within the range of 15,000 to 30,000 and a ratio between the weight average molecular weight ($M_w$) and the number average molecular weight ($M_n$) within the range of 2.5–9, introducing said polymer into a second polymerization step for producing olefin polymer containing said low molecular weight polymer and high molecular weight olefin polymer having a calculated $M_w$ within the range of 250,000–700,000 and a ratio of $M_w/M_n$ within the range of 4.5 to 9.5, the product formed in the second polymerization step having a ratio between the low molecular weight material and the high molecular material within the range of 30:70–55:45. According to the invention 5–60 percent by weight of the polymer formed in said first polymerization step is separated and melt-mixed with the product of the second polymerization step. This separated polymer portion is therefore not introduced to the second polymerization step. Instead it is combined and melt-mixed with the product coming out from the second polymerization step to form a polymer composition having a ratio of low molecular weight polymer fractions to high molecular weight fractions (product split) within the range of 40:60–60:40, preferably 45:55–60:40.

The mixing can be carried out by introducing the portion separated from the first polymerization step into the melt extruder, for example the pelletizing extruder, in which the second polymerization step product is melted and pelletized. In other words the first polymerization step product is blended with the second polymerization step product. It is also possible to melt the portion separated from the product of the first polymerization step separately and introduce this melt to the melting device for the product of the second polymerization step by using for example a side feed extruder attached to the pelletizing or homogenizing extruder.

Several advantages can be achieved in this way. First, in the second polymerization step a bimodal product can be formed, in which the ratio of the low molecular weight material to the high molecular weight material is within a favorable range in view of the homogenity of the product, e.g., between 30:70–50:50, but in the end product said ratio is between 50:50–70:30, whereby the product has good mechanical properties and processability without excessive formation of gels. Secondly, the process according to the invention makes it possible to affect the molecular weight of the end product and the total reactor split without necessarily changing the polymerization conditions in the second polymerization step. The grade changes of the end product become more easy and the total control of the process becomes quicker and more easy.

The separation of a portion from the first polymerization step is known as such. For example Japanese patent applications JP89221002 and JP89221003 disclose a process for manufacturing propylene-ethylene block copolymers, whereby in a first polymerization step liquid propylene is polymerized at slurry phase and said polypropylene slurry is fed into a gas-phase polymerization step, in which propylene-ethylene copolymer is polymerized. According to these publications the slurry from the first polymerization step is divided to a slurry containing mainly fine particles and to a slurry containing mainly coarse particles. The fine particles are returned to the slurry polymerization and the coarse particles are introduced into the gas-phase polymerization. With this method the advantages of this invention cannot be achieved.

According to the invention the separation of a part of the first reactor product can be carried out by any suitable method and device. In the case that both reactors are slurry polymerizations, for example loop-loop polymerization process, the separation is easy because the slurry flow can be simply divided into two streams. In the case that the first reactor is a slurry polymerization reactor and the second reactor is a gas-phase reactor, the product from the first reactor can be divided into two streams either before or after separation of the diluent. In the case that both reactors are gas-phase reactors, the product stream can be divided into two streams after the monomers are separated by flashing.

One preferable alternative is to use the classification of the product flow from the first reactor. This can be carried out by using known classifiers such as liquid cyclone classifier/concentrators or a combination of a concentrator and hydraulic sedimentation classifiers. If in the classification the fine particles from the first reactor product flow can be separated at least partly and introduced after by-passing the second gas-phase reactor to the end product, an additional advantage is achieved. The fine particles coming from the first reactor contain very little low molecular weight material and since they tend to be very active in the second reactor, the fraction of high molecular weight material in these particles becomes very high. Due to this they become very difficult to homogenize in the compounding step. The fact that the fines are catalytically very active means that they tend to cause local overheating and formation of agglomerates, which leads to increased amount of gels in the end product.

In the process according to the invention any suitable catalysts, which give the desired molecular weight properties to the polymer products, can be used. Preferable catalysts are Ziegler-type catalysts, although other catalyst types such as chromium catalysts or metallocene-catalysts can be used, when possible. These catalysts can be used with any known cocatalysts in either one or both reactors. It is also possible to use catalysts only in the first polymerization step or in both steps or different type of catalysts can be used in producing low molecular weight polymers and bimodal polymers containing both low molecular weight material and high molecular weight material.

Preferable catalysts are for example those disclosed in Finnish patent applications FI916192, FI905523, FI904523, FI902123, FI901895, FI900842, FI906323, FI895703, FI895526, FI894216, FI893621, FI892153 and FI862459. However it is to be noted that the process according to the invention is not a catalyst specific process and therefore any catalyst giving an appropriate activity and a controllable molecular weight can be used in the process according to the invention.

BRIEF DESCRIPTION OF THE DRAWINGS

The invention is further illustrated by referring to the accompanying figures, in which.

DETAILED DESCRIPTION OF THE INVENTION

Figure 1:
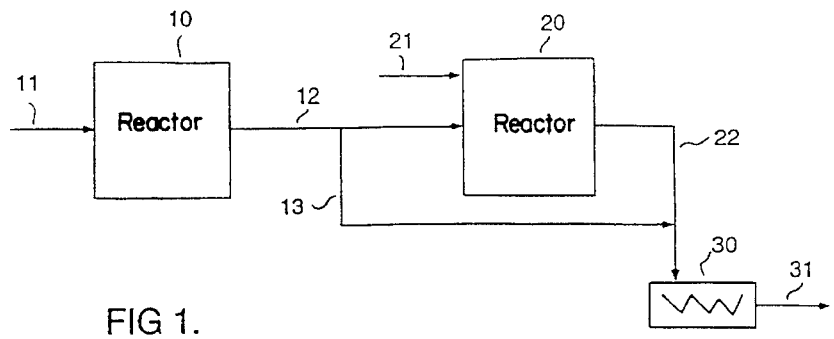
FIG. 1 shows as a diagram the general principle of the method according to the invention.

In FIG. 1 there is disclosed the general principle of the process according to the invention. The first step polymerization is carried out in the first reactor 10 by feeding the reactants via line 11. The reactants are polymerizable monomers, comonomers, hydrogen, diluents, catalysts etc. The reactor 10 can be of any type, such as a slurry reacto, for example a stirred-type reactor, loop reactor etc. The low molecular weight polymer from reactor 10 is taken away through line 12 and transferred to the second reactor 20. Monomers, comonomers, hydrogen, catalyst and cocatalyst components etc. can be fed to the reactor 20 through feed systems referenced by line 21. The product of the second reactor containing low molecular weight fractions and high molecular weight fractions is taken from reactor 20 through line 22 and transferred to a pelletizing or homogenizing mixer or extruder 30. The end product is taken from extruder 30 through line 31. The second step reactor 20 can likewise be of any type such as a slurry reactor or gas-phase reactor.

According to the invention a part of the product of the first step reactor 10 is separated from the product transfer system represented by line 12 and is passed-by the second reactor 20 through line 13 and combined with the product coming from the second step reactor 20 through line 22.

Figure 2:
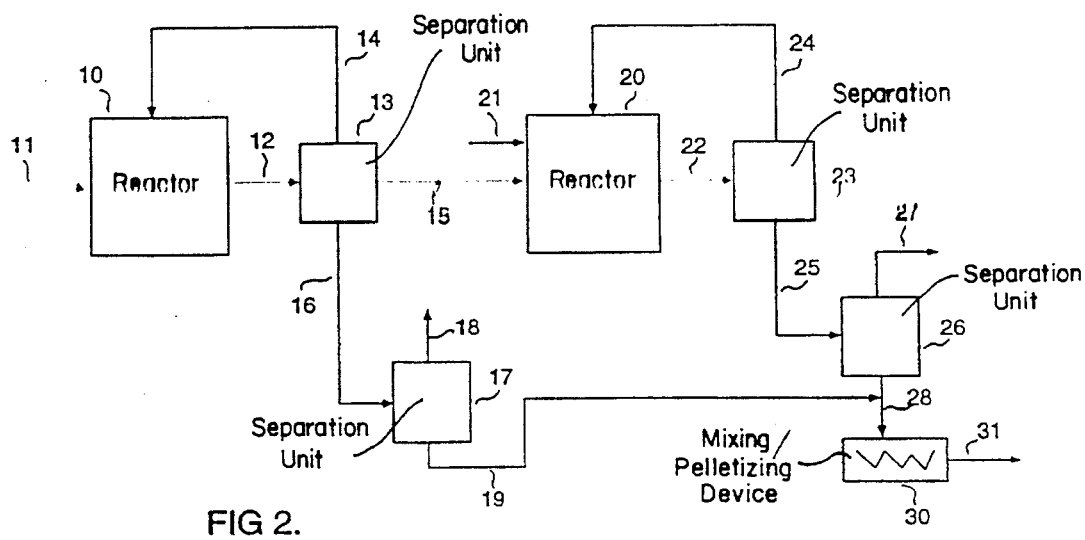
FIG. 2 shows as a diagram one embodiment of the process according to the invention, in which a part of the first step product is passed-by the second step polymerization and dry-blended with the product of the second step polymerization.

In FIG. 2 the product coming out from the first reactor 10 through line 12 is transferred to a separation unit 13, which serves to separate unreacted monomers and diluents from the polymer product in the case that the reactor 10 is for example a slurry polymerization reactor. The separated gaseous and other components are returned to the reactor 10 through line 14. The separation unit 13 can function also as a device for separating from the polymer product a portion of the polymer, which is transferred through line 16 into an optional additional separation unit 17. It can be used to separate unreacted components such as monomers, hydrogen or diluents from the polymer. These components can be removed through line 18.

Corresponding separation units can be used in connection of the second reactor 20. Thus the polymer from the reactor 20 can be removed through line 22 to the separation unit 23, from which gaseous components can be returned to the reactor 20 through line 24 and the polymer product can be transferred through line 25 to an optional second separation unit 26. Gaseous or other components can be further separated and removed through line 27. The polymer product is transferred through line 28 to a pelletizing extruder or mixer 30, from which the final product is removed through line 31.

According to the invention the polymer through line 19, which polymer constitutes a part of the low molecular weight polymer produced in the first reactor 10, is transferred through line 19 to line 28. Through line 28 both polymer fractions are transferred to the mixing or pelletizing device 30 to form the product according to the invention.

In FIGS. 1 and 2 only the basic principle according to the invention is disclosed. Various modifications can be made concerning devices for separating portions from polymer flows, unreacted components etc. Such modifications can include cyclone separators or settling tank devices for dividing polymer flows into separate streams or classifying low molecular weight polymer into fractions having certain particle size distribution. One preferable option according to the invention includes removing especially small particles or fine fractions from the first step polymerization product and transferring these fractions straight to the end product.

Figure 3:
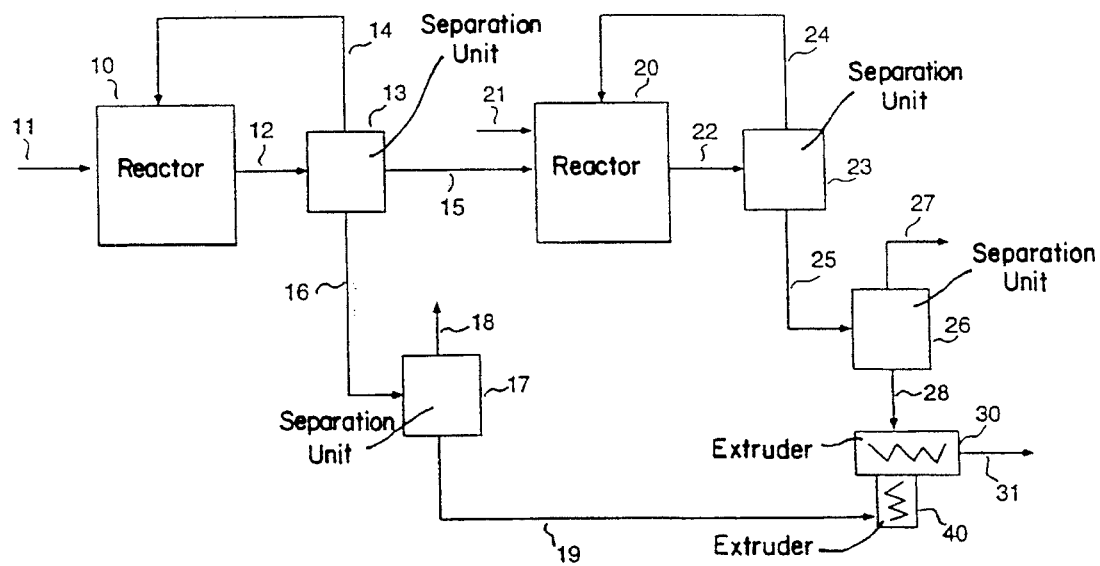
FIG. 3 discloses a modification of the process of FIG. 2, in which a part of the first step polymerization product is melted in a side-feed extruder attached to the pelletizing extruder for the second step polymerization product.

FIG. 3 discloses a further modification of the process according to FIG. 2. In this case a side feed extruder 40 is attached to the pelletizing mixer or extruder 30. The polymer portion separated from the first step polymerization product is transferred to the side feed extruder 40, where it is melted and led in molten condition to the extruder 30.

While the process according to the invention has been illustrated above as applied to two-step polymerization process, it is to be understood that both the first step polymerization and the second step polymerization can comprise two or more polymerization reactors in tandem. Such modifications belong also to the scope of the invention. It is also to be understood that each polymerization step can be carried out as a slurry polymerization, gas phase polymerization or even as a solution polymerization.

The invention is further illustrated by referring to the following examples, in which a combination of loop-gas phase-polymerization was used for producing bimodal high density polyethylene. Ethylene was first polymerized in a pilot-scale loop-reactor having a production capacity of about 50 kg/h and in a gas-phase reactor having a capacity of about 75 kg/h. The catalyst added to the loop reactor was a Ziegler-type catalyst containing magnesium, titanium and chlorine on a silica carrier prepared as described in Finnish patent No. 89500. Hydrogen was used as a modifier and propane as diluent in the loop reactor.

In runs 1–3 the whole loop reactor product was introduced into the gas phase reactor. In runs 4–5 a part of the loop reactor product was separated according to the invention and combined with the gas phase reactor product and melted in an extruder (ZSK-30, Werner-Pfleiderer) for pelletizing the product. In runs 6–10 a part of the loop reactor product was separated according to the invention and melted in a side extruder, which was attached to the side of the main extruder.

The properties of the reactor and end products in runs 1–10 are presented in the following Table 1. It is evident from the table that a great amount of gels is produced, when the product split is high and the whole loop reactor product was introduced to the gas phase reactor (62:38–57:43 in runs 1–3). In runs 4–7 according to the invention, where also a high reactor splits in the end product was used, but a part of the loop reactor product was separated and combined with the gas-phase reactor product, where the reactor split was lower, much lower gel contents are achieved. The lowest gel contents were achieved when the product portion separated from the loop reactor product was melted before combining it with the product of the gas phase reactor.

Runs 11–17 were performed by using the same polymerization procedure as in runs 1–10. Brabender-extruder was used to combine the portion separated from the loop reactor product with the gas reactor product. The properties of the reactor and end products are presented in the Table 2.

TABLE 1

| | \multicolumn{10}{c}{Run} |
|---|---|---|---|---|---|---|---|---|---|---|
| | 1 | 2 | 3 | 4 | 5 | 6 | 7 | 8 | 9 | 10 |
| Loop reactor product: | | | | | | | | | | |
| Density (g/dm$^3$) | 970 | 971 | 972.3 | 971.8 | 972.3 | 971.8 | 972.3 | 973.2 | 972.2 | 971.7 |
| MFR$_2$ (g/10 min at 190° C.) | 20 | 90 | 165 | 116 | 165 | 116 | 165 | 244 | 149 | 116 |
| M$_w$ | — | — | — | 28920 | — | — | 25000 | 21700 | 26280 | — |
| Product to gas-phase (%) | 100 | 100 | 100 | 56.2 | 56.3 | 56.2 | 56.3 | 62.7 | 59.3 | 66.9 |
| Bypass of gas-phase (%) | — | — | — | 43.8 | 43.7 | 43.8 | 43.7 | 30.3 | 40.7 | 33.1 |
| Gas-phase product: | | | | | | | | | | |
| Density (g/dm$^3$) | 949.6 | 948.8 | 952.5 | 944.5 | 944.0 | 944.5 | 944.0 | 948.8 | 950 | 951.0 |
| M$_w$ | | | | 464000 | | 370000 | | | | |
| M$_w$/M$_n$ | | | | 16 | | 20 | | | | |
| MFR$_5$ (g/10 min, 190° C.) | 0.9 | 0.5 | 0.6 | | | | | | | |
| MFR$_{21}$ (g/10 min, 190° C.) | 7.8 | 7.9 | 8.9 | 1.7 | 1.52 | 1.7 | 1.52 | 8 | 6 | 13 |
| Reactor split low M$_w$/high M$_w$ | 62:38 | 57:43 | 57:43 | 45:55 | 46:54 | 45:55 | 46:54 | 46:54 | 45:55 | 45:55 |
| End product | | | | | | | | | | |
| Density (g/dm$^3$) | 949.6 | 948.8 | 952.5 | 963.5 | 953.7 | 952.5 | 953.4 | 953 | 955 | 955.0 |
| Product split low M$_w$/high M$_w$ | 62:38 | 57:43 | 57:43 | 60:40 | 60:40 | 60:40 | 60:40 | 55:45 | 58:42 | 55:45 |
| MFR$_5$ (g/10 min, 190° C.) (measured from pellets) | 0.28 | 0.27 | 0.30 | 0.40 | 0.31 | 0.47 | 0.28 | 0.494 | 1.36 | 0.867 |
| M$_w$ | | 320 | | 247 | 276 | 244 | 306 | | | |
| M$_w$/M$_n$ | | 17.2 | | 17.0 | 21.8 | 16.7 | 27.2 | | | |
| Gels/m$^2$ | 13500 | 8700 | 9100 | 3010 | 3100 | 1800 | 2100 | 120D | 240 | 310 |
| CTL (6.5 MPa) | | | 133 | | | | 143 | | | |

CTL = Const. tensile load at 6.5 MPa

TABLE 2

| | \multicolumn{7}{c}{Run} |
|---|---|---|---|---|---|---|---|
| | 11 | 12 | 13 | 14 | 15 | 16 | 17 |
| Loop reactor product | | | | | | | |
| Density (g/dm$^3$) | 973.2 | 973.2 | 973.3 | 971.7 | 971.7 | 971.7 | 971.7 |
| MFR$_2$ (g/10 min at 190° C.) | 245 | 245 | 245 | 116 | 116 | 116 | 116 |
| Product to gas-phase (%) | 80.0 | 71.4 | 65.0 | 90.0 | 77.8 | 69.1 | 62.5 |
| By-pass of gas-phase (%) | 20.0 | 28.6 | 35.0 | 10.0 | 22.2 | 30.9 | 37.5 |
| Gas-phase product: | | | | | | | |
| Density (g/dm$^3$) | 949.1 | 949.1 | 949.1 | 944.5 | 944.5 | 944.5 | 944.5 |
| MFR$_{21}$ (g/10 min, 190° C.) | 5.2 | 5.2 | 5.2 | 2.16 | 2.16 | 2.16 | 2.16 |
| Reactor split low M$_w$/high M$_w$ | 46:54 | 46:54 | 46:54 | 45:55 | 45:55 | 45:55 | 45:55 |
| End product | | | | | | | |
| Density (g/dm$^3$) | | 955 | | 949 | 952 | 952 | |
| Product split low M$_w$/high M$_w$ | 55:45 | 58:42 | 60:40 | 50:50 | 55:45 | 58:42 | 60:40 |
| MFR$_{21}$ (g/10 min, 190° C.) (measured from pellets) | 15.7 | 21.6 | 27.6 | 3.33 | 5.4 | 8.28 | 11.1 |
| Gels/m$^2$ | 42 | 170 | 580 | 13 | 145 | 130 | 490 |

We claim:

1. A process for producing bimodal olefin homopolymers or copolymers in a polymerization sequence, comprising:
   a) conducting a first polymerization step in a first polymerization reactor to form a unimodal low molecular weight polymer having a weight average molecular weight of from 15,000 to 30,000 and a melt index of from 10–10,000 g/10 min.;
   b) diverting from 5 to 50% of said unimodal polymer to a separate stream and directing the remaining portion of said unimodal polymer to a second polymerization reactor so that said diverted portion bypasses said second polymerization reactor;
   c) conducting a second polymerization step in said second polymerization reactor to form a first bimodal olefin homopolymer or copolymer consisting of:
      i) 30–55% of said unimodal low molecular weight polymer; and
      ii) 45–70% of a high molecular weight polymer, having a weight average molecular weight of from 250,000 to 700,000; and
   d) melt blending said diverted portion of said unimodal low molecular weight polymer with said first bimodal olefin homopolymer or copolymer to form a second bimodal olefin homopolymer or copolymer having a decreased amount of gels.

2. The process of claim 1, wherein said melt blending is carried out under shear forces.

3. The process of claim 1, wherein said second bimodal olefin homopolymer or copolymer has a weight average molecular weight of from 150,000 to 400,000.

4. The process of claim 1, wherein the ratio of said low molecular weight polymer to said high molecular weight polymer (product split) in said second bimodal olefin homopolymer or copolymer is from 40:60 to 70:30.

5. The process of claim 1, wherein said unimodal low molecular weight polymer is formed in at least one slurry polymerization step.

6. The process of claim 5, wherein said unimodal low molecular weight polymer is formed in a loop polymerization step.

7. The process of claim 1, wherein said first bimodal weight polymer is formed in at least one gas-phase polymerization step.

8. The process of claim 1, wherein said unimodal low molecular weight polymer and said first bimodal olefin homopolymer or copolymer are formed in two slurry polymerization steps.

9. The process of claim 1, wherein said unimodal low molecular weight polymer and said first bimodal olefin homopolymer or copolymer are formed in two gas-phase polymerization steps.

10. The process of claim 1, further comprising the steps of separating the fines from said unimodal low molecular weight polymer and combining said fines by melt mixing with said first bimodal weight polymer.

11. The process of claim 1, wherein said melt blending is carried out in a pelletizing device.

12. The process of claim 10, wherein said unimodal low molecular weight polymer and said first bimodal olefin homopolymer or copolymer are melted before said melt mixing step.

13. The process of claim 12, wherein said unimodal low molecular weight polymer is melt-mixed in a side extruder attached to said pelletizing device.

14. The process of claim 1, wherein said unimodal low molecular weight polymer is ethylene.

15. The process of claim 1, wherein said second bimodal olefin homopolymer or copolymer comprises a member of the group consisting of ethylene, propylene, butene, hexene and 4-methyl-1-pentene.

16. The process of claim 1, wherein said unimodal low molecular weight polymer has a number average molecular weight such that the ratio of the weight average molecular weight to the number average molecular weight is from 2.5 to 9.

17. The process of claim 1, wherein said second bimodal olefin homopolymer or copolymer has a weight average molecular weight to the number average molecular weight is from 10 to 40.

18. The process of claim 1, wherein said high molecular weight polymer has a number average molecular weight such that the ratio of the weight average molecular weight to the number average molecular weight is from 4.5 to 9.5.

* * * * *